Nov. 24, 1953

E. W. FROWE 2,660,062

GRAVIMETER APPARATUS

Filed March 17, 1950

Inventor
Eugene W. Frowe
Attorney

Nov. 24, 1953  E. W. FROWE  2,660,062
GRAVIMETER APPARATUS
Filed March 17, 1950  2 Sheets-Sheet 2
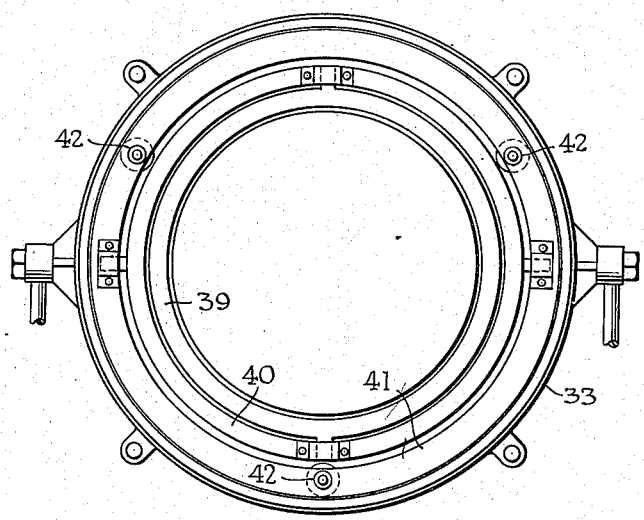
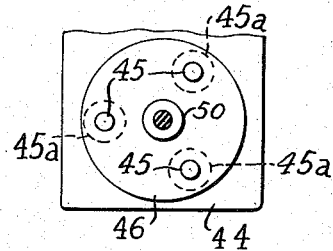
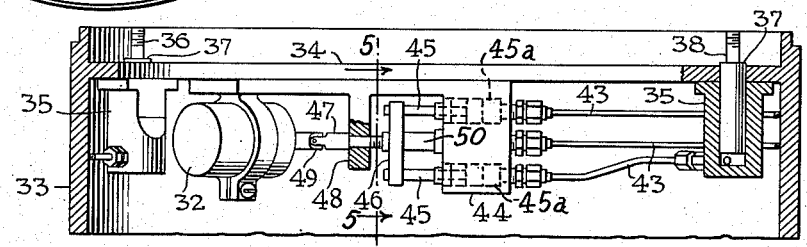
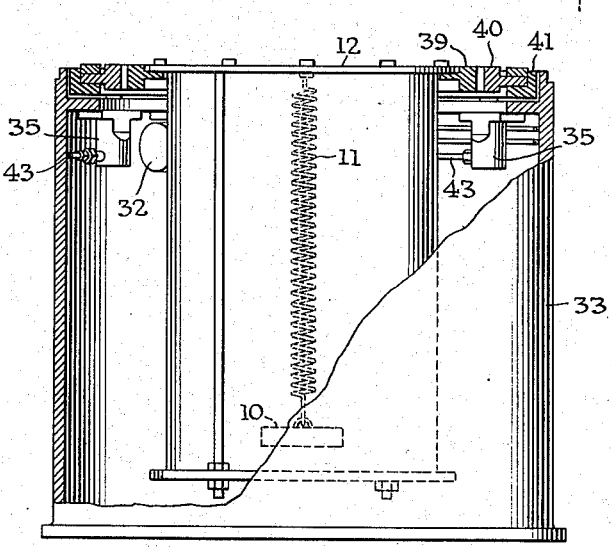
Inventor
Eugene W. Frowe
By
Attorney Patented Nov. 24, 1953

2,660,062

UNITED STATES PATENT OFFICE 2,660,062

GRAVIMETER APPARATUS

Eugene W. Frowe, Houston, Tex., assignor to Robert H. Ray Co., Houston, Tex., a partnership consisting of Robert H. Ray and Jack C. Pollard Application March 17, 1950, Serial No. 150,270

5 Claims. (Cl. 73—382)

This invention relates to motion compensators and more particularly to motion compensating apparatus employed in connection with gravimeters.

Gravimeters are now extensively used for making oil surveys i. e. to locate certain types of subsurface formations which are likely to indicate the presence of oil. These surveys require very accurate measurement of the force of the earth's gravity at a plurality of points. When making such surveys in inaccessible terrain such as swamps or on submerged bottoms, it is now generally the practice to use remote reading gravimeters in which a photoelectric cell and light source are employed within the gravimeter housing to generate a voltage proportional to the position of a movable mass. This voltage is then fed through cables to a remote control point where it actuates a D'Arsonval type meter or other equivalent indicating means.

In many locations and particularly on the ocean bottom, disturbed conditions of the surface on which the meter rests preclude accurate measurements. The disturbed conditions may be seismic in nature or, on a soft ocean bottom they may be due to wave motion. In any event movements of the movable mass of the gravimeter in excess of about 0.008 inch prevent accurate readings.

It is an object of this invention to compensate for these movements of the gravimeter in order to permit accurate readings even under disturbed surface conditions.

It is a further object of this invention to provide a compact and highly efficient apparatus for this purpose which will be entirely automatic in operation and can be controlled from a remote point as conditions require.

It is a further object to provide a compensating apparatus which will maintain the vertical position of a gravimeter within extremely narrow limits.

Further objects will be apparent from the following description read in conjunction with the acompanying sheets of drawings in which Figure 1 shows the apparatus of my invention in diagrammatic form.

Figure 2 is a view partially in section of the gravimeter supported within a watertight outer casing together with a part of the motion compensating apparatus.

Figure 3 is a more detailed view of the raising and lowering means.

Figure 4 is a top view showing the gimbal supports for the gravimeter.

Figure 5 is a view taken on lines 5—5 of Figure 3.

Figure 1:
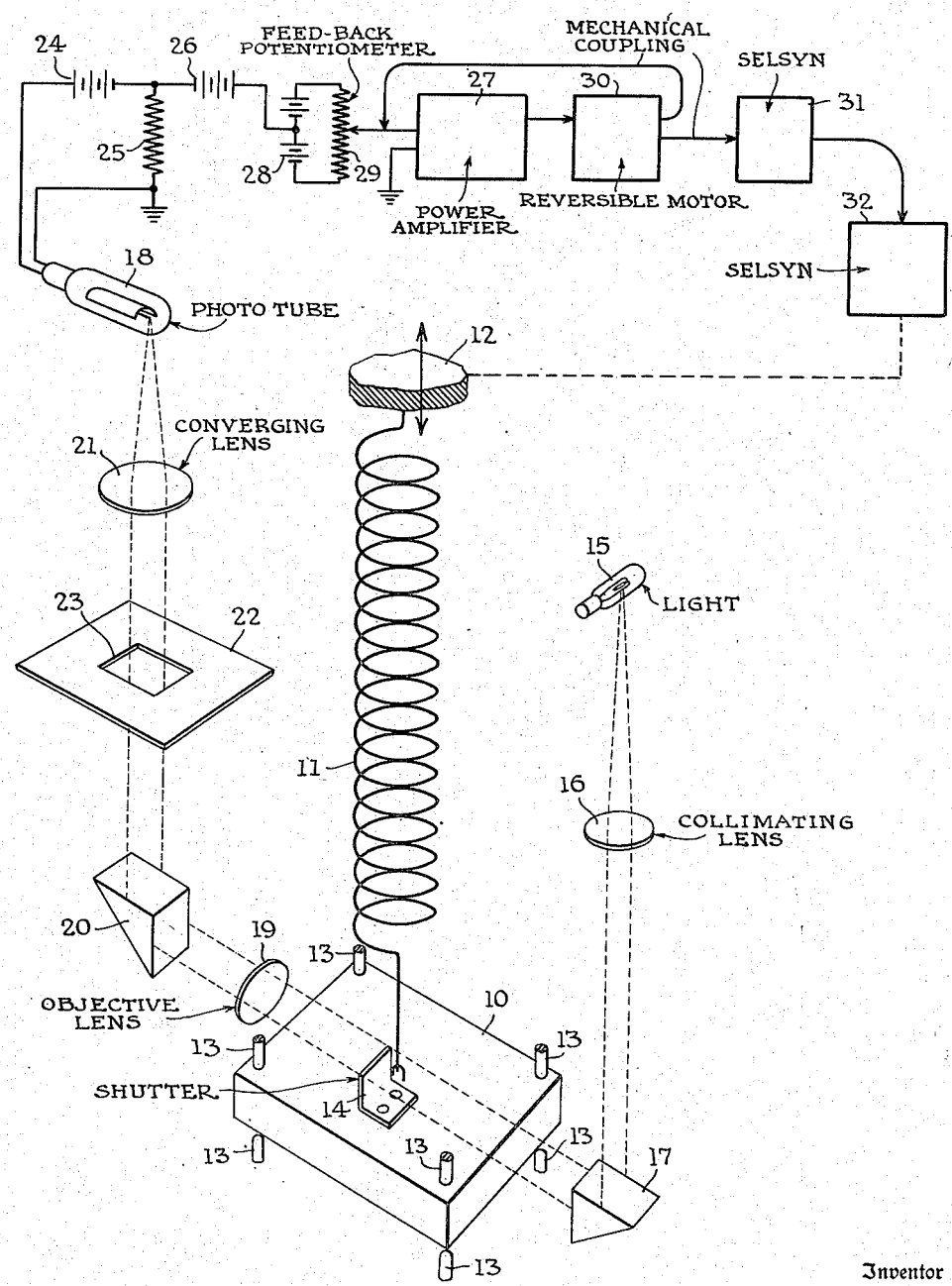

In general I achieve the objects of my invention by supporting a gravimeter in vertically adjustable position, and then actuate the adjustable supporting means so that as the gravimeter moves up or down due to a surface disturbance, the compensator automatically moves the meter in the opposite direction. Thus the surface may move .01 inch or more in a vertical direction and yet the movable mass of the gravimeter may be held within a range of .008 inch of movement.

In a preferred embodiment of my invention the adjustable supports are similar to hydraulic jacks and each is operated from a master hydraulic cylinder unit. The entire hydraulic system is operated by an electro-mechanical servo-system. A photoelectric cell and light source employed in connection with the movable mass furnish a controlling voltage for a reversible motor which drives the servo-system. The controlling voltage is directly proportional to movements of the gravimeter caused by disturbed surface conditions.

Referring now to Figure 1 of the attached sheets of drawings, this shows, diagrammatically an electro-optical system employed in conjunction with the movable mass of a gravimeter to furnish the desired controlling voltage as well as a block diagram of a preferred electro-mechanical servo-system.

The movable mass 10 of the gravimeter is suspended on a spring 11 from the meter casing 12. Stops 13 are positioned on opposite sides of the movable mass to prevent movements in excess of about .012 inch. A bracket 14 is attached to the movable mass substantially as shown. Rays of light from a source 15 are directed on the bracket 14, by any convenient optical system, here shown as a collimating lens 16 and prism 17. The image or shadow of the bracket is then projected toward a photocell 18 by means of an objective lens 19, prism 20 and converging lens 21. Between the prism 20 and the converging lens 21 is positioned a piece of opaque material 22 having an opening 23 therein. The bracket member 14 is then in effect, a curtain or shutter which is drawn across the opening 23 by vertical movements of the mass 10. The amount of light falling on the photocell 18 is therefor proportional to the position of the mass 10 and any suitable indicating means connected in the output of the photocell circuit can be calibrated to yield readings of the vertical position of the mass. Since the vertical position of the mass is always proportional to the strength of the earth's gravity, the addition of an indicating means to the photocell output circuit would complete the basic equipment for a remote reading gravimeter, as the indicating means could be located at any remote point while the entire electro-optical system may be placed within the closed casing for the movable mass.

From a brief study of the above apparatus it should be apparent that in order to obtain an accurate measurement of the earth's gravity, the mass 10 must be substantially stationary. Under all ordinary conditions the mass will of course come to rest following a period of oscillation which is bound to occur due to setting up and unclamping the gravimeter. Under certain conditions, however, and particularly in submerged locations, the earth's surface is in a more or less continual state of movement. It is not definitely known whether this is due to seismic disturbances or to wave motion of the overlying water but in any event, the movement is often of sufficient amplitude to preclude accurate gravimeter readings.

The block diagram at the top of Figure 1 shows a simplified circuit diagram which may be used in conjunction with the electro-optical system described above to compensate for vertical movements of the gravimeter due to disturbed surface conditions.

Battery 24 and resistor 25 are connected in series with the photocell 18 so that any illumination of the photocell will cause current to flow in this circuit and a voltage will be developed across resistor 25. Battery 26 is also connected to resistor 25 and is adjusted so that its voltage is exactly equal and opposite to that developed across resistor 25 by battery 24 when the shutter 14 is half-way across the opening 23. Any movement of the mass from this position will produce a resultant voltage across resistor 25 and battery 26. This voltage is fed to an amplifier 27 through the battery 28 and potentiometer 29. The amplifier controls a reversible motor 30 which drives one of a pair of Selsyns 31 and 32. Motor 30 also drives the wiper arm of potentiometer 29 in a direction to restore the system to balanced condition. Rotation of the Selsyn pair therefore is controlled in accordance with movements of the gravimeter and the two bear a direct proportion to each other except for the feedback potentiometer 29 which tends to decrease the rotation of the Selsyns and thus make the system, as a whole, more stable.

Referring now to Figures 2, 3, and 4 of the attached drawings, the numeral 10 again represents the movable mass of the gravimeter suspended on a spring 11 from the casing 12. The gravimeter, casing included, is supported within a housing 33 which will have a cover (not shown) to make it entirely watertight. As is shown in Figure 3 the housing has an inwardly projecting lip or flange 34 near the top thereof. This flange serves to support a plurality (in this case 3) of hydraulic cylinders 35. Each cylinder is bolted or otherwise rigidly attached to the underside of the flange. Pistons 36 are mounted in each cylinder and each piston has a shoulder 37 and a threaded top portion 38.

The gravimeter casing 12 is rigidly attached to the inner ring of a pair of gimbal rings 39 and 40. A third ring 41 concentrically arranged with respect to the two gimbal rings and carrying the female bearings for the gimbal ring 40 is rigidly attached to the pistons 36. Ring 41 has openings 42 which allow it to fit over the pistons 36 and rest on the shoulders 37. Nuts are then screwed on the threaded portions 38 of the pistons to clamp the ring 41 rigidly thereto.

Each cylinder 35 is connected by a closed conduit 43 to a master hydraulic cylinder unit 44 which latter is rigidly secured to the underside of flange 34. The master cylinder unit 44 includes three separate and distinct cylinders 45a. In each of these cylinders is a piston or plunger 45. The outer ends of each of the plungers 45 are rigidly connected to a disc member 46. A fourth plunger 50, also rigidly connected to disc member 46, is internally screw threaded to mate with a threaded shaft 47 driven by Selsyn 32. Rotation of shaft 47, therefore, serves to drive the three plungers 45 in unison in their respective cylinders 45a. The threaded shaft 47 is journaled at 48 and connected by means of a universal joint 49 to the shaft of Selsyn 32. Each of the cylinders 35 having pistons 36 movable therein are connected to the master cylinder unit by means of the fluid conduits 43 to form a plurality of closed hydraulic systems having a constant distribution of fluid pressure throughout. Changes in the position of the plungers 45 in the master cylinder unit therefor, actuate each of the pistons 36 by a substantially equal amount.

The operation of the compensator is as follows: With the gravimeter resting on a disturbed surface, all movements of the surface cause a corresponding movement of the mass 10. This causes a change in the illumination of the photocell 18, which of course changes its conductivity. The resulting change in current through resistor 25 causes a voltage which is proportional to the displacement of the mass to be applied to the input of the amplifier through the potentiometer 29. The amplifier in turn energizes the reversible motor 30 which drives the Selsyn 31 through a mechanical coupling. Selsyn 32, which is electrically connected to Selsyn 31 and will therefor turn by a corresponding amount, operates the plungers 45 within their respective cylinders 45a. This raises or lowers the gravimeter through the closed hydraulic system on which it is suspended within its housing. As the motor 30 rotates to drive Selsyn 31, it also drives the wiper arm of potentiometer 29 in a direction to reduce the voltage input to the amplifier. Thus any movement of the surface on which the gravimeter is resting is compensated for by moving the gravimeter in the opposite direction. The compensation is not complete because of the action of the potentiometer 29. Actual compensation is in the neighborhood of 75% to 90% but it has been found in practice that this is sufficient to limit the total movement of the mass to less than .008 inch. The feedback potentiometer 29 is of course necessary to prevent the motor from over-running following a compensating period and also to prevent it from running when there is no disturbance requiring compensation.

It will be apparent that the hydraulic system shown and described herein may have a wide variety of structural equivalents both mechanical and hydraulic.

The servo-system shown in Figure 1 is also merely representative of one practical embodiment and has many possible full equivalents.

The novel features of my invention are set forth with particularity in the following claims:

I claim:

1. Geophysical prospecting apparatus comprising in combination: an inner casing; a mass suspended on a spring within said casing; a photoelectric system, including a light source and light sensitive cell within said casing, responding to changes in the position of said mass; an outer casing; means including said photoelectric system for deriving a voltage proportional to vertical displacement of said apparatus caused by disturbances of the earth's surface; means including a plurality of jacks attached to said outer casing and supporting said inner casing therein in adjustable relation thereto; means including an electromechanical servo-system connected to operate said jacks in unison to cause compensating vertical displacements of said inner casing; and electrical amplifying means connected to operate said servo-system in accordance with said derived voltage.

2. Geophysical prospecting apparatus comprising in combination: an inner casing; a mass suspended on a spring within said casing; a photoelectric system, including a light source and light sensitive cell within said casing, responding to changes in the position of said mass; an outer housing; means including said photoelectric system for deriving a voltage proportional to vertical displacement of said apparatus caused by disturbances of the earth's surface; means including a plurality of hydraulic jacks attached to said outer housing and supporting said casing therein in adjustable relation thereto; means including an electromechanical servo-system connected to operate said jacks to cause compensating vertical displacements of said inner casing; and electrical amplifying means connected to drive said servo-system in accordance with said derived voltage.

3. Submarine geophysical prospecting apparatus comprising in combination: a gravimeter of the type in which a photoelectric system including a light source and a light sensitive cell is employed to indicate at a remote point the position of a movable mass; a watertight outer housing for said gravimeter; adjustable means supporting said gravimeter within said housing including a plurality of hydraulically operated pistons; means including said photoelectric system for deriving a voltage proportional to vertical displacements of said gravimeter caused by disturbances of the earth's surface; means including an electromechanical servo-system connected to operate said pistons to cause compensating vertical displacements of said gravimeter; and electrical amplifying means connected to operate said servo-system in accordance with said derived voltage whereby vertical displacements of said gravimeter caused by disturbed conditions of the earth's surface are compensated for by substantially equal and opposite vertical displacements.

4. A seismic compensated gravimeter comprising: an inner casing; a mass suspended on a spring within said casing; a photoelectric system within said casing including a light source and a light sensitive cell; an optical system also within said casing including means for directing light from said source onto said photocell; an opaque projection extending outwardly from a surface of said mass and into the path of light from said light source to said cell so that changes in the position of the movable mass effect corresponding changes in the illumination of said cell; amplifying means connected to the output of said photocell; a reversible motor connected to the output of said amplifier so as to be reversibly driven thereby; a servo-system connected to said reversible motor so as to be reversibly driven thereby; mechanical feedback means connected between the servo-system and the amplifier input controlling the amplifier in order to reduce the input to said amplifier as said servo-system operates in response to changes in the position of said mass; a waterproof outer housing for said gravimeter; means adjustably supporting said inner casing within said outer housing, and means connecting said servo-system to drive said adjustable supporting means; whereby substantially continuous compensation is provided for vertical displacements of said gravimeter caused by disturbances of the surface upon which the gravimeter rests.

5. A seismic compensated gravimeter as defined by claim 4 in which the mechanical feedback means comprises a potentiometer connected between the photoelectric system and the input of said amplifying means; and a mechanical connection between a rotative portion of the servo-system and the arm of said potentiometer whereby rotation of the servo-system in response to voltage changes of the photoelectric system serves to decrease the voltage applied to the input of said amplifying means.

EUGENE W. FROWE.

References Cited in the file of this patent

UNITED STATES PATENTS

| Number | Name | Date |
|---|---|---|
| 2,261,087 | Jones | Oct. 28, 1941 |
| 2,268,017 | Busick | Dec. 30, 1941 |
| 2,294,201 | Pepper | Aug. 25, 1942 |
| 2,362,135 | James | Nov. 7, 1944 |
| 2,362,616 | Cloud | Nov. 14, 1944 |
| 2,367,126 | James | Jan. 9, 1945 |
| 2,589,709 | La Coste et al. | Mar. 18, 1952 |
| 2,589,710 | La Coste et al. | Mar. 18, 1952 |

FOREIGN PATENTS

| Number | Country | Date |
|---|---|---|
| 571,613 | Great Britain | Aug. 31, 1945 |

OTHER REFERENCES

Ser. No. 297,006, Steinen (A. P. C.), published May 25, 1943.